United States Patent
Dey et al.

(10) Patent No.: US 12,439,172 B2
(45) Date of Patent: Oct. 7, 2025

(54) AUXILIARY ENGINE FOR HARDWARE VIRTUALIZATION

(71) Applicant: QUALCOMM Incorporated, San Diego, CA (US)

(72) Inventors: Abhijeet Dey, Bengaluru (IN); Animesh Behera, Bengaluru (IN); Joby Abraham, Bangalore (IN); Amrit Anand Amresh, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 18/059,856

(22) Filed: Nov. 29, 2022

(65) Prior Publication Data

US 2024/0179422 A1    May 30, 2024

(51) Int. Cl.
*H04N 23/80* (2023.01)

(52) U.S. Cl.
CPC ................................. *H04N 23/80* (2023.01)

(58) Field of Classification Search
CPC ...... H04N 23/80; H04N 23/90; H04N 23/698; H04N 23/81–88; H04N 23/957; H04N 25/60; H04N 25/611; H04N 25/672; G06T 1/20
See application file for complete search history.

(56) References Cited

U.S. PATENT DOCUMENTS

| | | | | |
|---|---|---|---|---|
| 10,453,166 B2 * | 10/2019 | Nakazono | ............ | G06F 15/173 |
| 2004/0114821 A1 * | 6/2004 | Fukuzawa | ................ | G06T 5/90 |
| | | | | 348/222.1 |
| 2005/0141607 A1 * | 6/2005 | Kaplinsky | ............ | H04N 23/698 |
| | | | | 348/E7.086 |
| 2011/0242115 A1 * | 10/2011 | Tsao | ........................ | G06T 1/20 |
| | | | | 345/522 |
| 2020/0068124 A1 * | 2/2020 | Ardö | ...................... | H04N 23/80 |
| 2020/0186751 A1 * | 6/2020 | Tran | ..................... | H04N 23/617 |
| 2023/0171397 A1 | 6/2023 | Dabral et al. | | |
| 2023/0232097 A1 * | 7/2023 | Umejima | ............. | H04N 23/661 |
| | | | | 348/211.2 |
| 2023/0269491 A1 * | 8/2023 | Uhlig | .................... | H04N 23/90 |
| | | | | 348/148 |

OTHER PUBLICATIONS

Choi S.H et al., "A parallel camera image signal processor for SIMD architecture", Eurasip Journal on Image and Video Processing, vol. 2016, No. 1, Dec. 1, 2016, XP093123360, 14 Pages, Title page 1, left-hand column.
International Search Report and Written Opinion—PCT/US2023/076592—ISA/EPO—Feb. 19, 2024.

* cited by examiner

*Primary Examiner* — Albert H Cutler
(74) *Attorney, Agent, or Firm* — Polsinelli/Qualcomm (57) ABSTRACT

Techniques are described herein for processing data. For instance, a process can include receiving input data by a symmetrical processing engine of two or more symmetrical processing engines coupled to an auxiliary processing engine. The process can further include receiving an indication to process the input data using a module of the auxiliary processing engine, transmitting output data to the auxiliary processing engine, receiving processed data from the auxiliary processing engine, further processing the processed data in one or more portions of a pipeline of modules of the symmetrical processing engine, and outputting the further processed data.

17 Claims, 6 Drawing Sheets

AUXILIARY ENGINE FOR HARDWARE VIRTUALIZATION

TECHNICAL FIELD

The present disclosure generally relates to generating high dynamic range (HDR) images. For example, aspects of the present disclosure relate to systems and techniques for reducing an amount of space used by an image processing system to generate a high dynamic range image, while still maintaining symmetry of image front ends of the image processing system.

BACKGROUND

A camera is a device that receives light and captures image frames, such as still images or video frames, using an image sensor. Cameras may include one or more processors, such as image signal processors (ISPs), that can process one or more image frames captured by an image sensor. For example, a raw image frame captured by an image sensor can be processed by an image signal processor (ISP) to generate a final image. Cameras can be configured with a variety of image capture and image processing settings to alter the appearance of an image. Some camera settings are determined and applied before or while an image is captured, such as ISO, exposure time (also referred to as exposure duration), aperture size, f/stop, shutter speed, focus, and gain, among others. Moreover, some camera settings can be configured for post-processing of an image, such as alterations to a contrast, brightness, saturation, sharpness, levels, curves, and colors, among others.

BRIEF SUMMARY

Systems and techniques are described herein for processing data, such as for processing graphical data. In one illustrative example, apparatus for processing data is provided. The apparatus comprises an auxiliary processing engine (e.g., configured in circuitry) and two or more symmetrical processing engines coupled to the auxiliary processing engine, each symmetrical processing engine of the two or more symmetrical processing engines including a pipeline of processing modules (e.g., configured in circuitry). A symmetrical processing engine of the two or more symmetrical processing engines is configured to: receive input data; receive an indication to process the input data using a module of the auxiliary processing engine; transmit output data to the auxiliary processing engine; receive processed data from the auxiliary processing engine; further process the processed data in one or more portions of a pipeline of modules of the symmetrical processing engine; and output the further processed data.

In another example, a method for processing data, the method comprising: receiving input data by a symmetrical processing engine of two or more symmetrical processing engines coupled to an auxiliary processing engine; receiving an indication to process the input data using a module of the auxiliary processing engine; transmitting output data to the auxiliary processing engine; receiving processed data from the auxiliary processing engine; further processing the processed data in one or more portions of a pipeline of modules of the symmetrical processing engine; and outputting the further processed data.

In another example, a non-transitory computer-readable medium is provided that includes instructions which, when executed by one or more processors, cause the one or more processors to: receive input data by a symmetrical processing engine of two or more symmetrical processing engines coupled to an auxiliary processing engine; receive an indication to process the input data using a module of the auxiliary processing engine; transmit output data to the auxiliary processing engine; receive processed data from the auxiliary processing engine; further process the processed data in one or more portions of a pipeline of modules of the symmetrical processing engine; and output the further processed data.

In another example, an apparatus for processing data, the apparatus comprising: means for receiving input data by a symmetrical processing engine of two or more symmetrical processing engines coupled to an auxiliary processing engine; means for receiving an indication to process the input data using a module of the auxiliary processing engine; means for transmitting output data to the auxiliary processing engine; means for receiving processed data from the auxiliary processing engine; means for further processing the processed data in one or more portions of a pipeline of modules of the symmetrical processing engine; and means for outputting the further processed data.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a mobile device (e.g., a mobile telephone or so-called "smart phone" or other mobile device), a wearable device, a personal computer, a laptop computer, a tablet computer, a server computer, a robotics device or system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) can implement cameras to capture images or video frames of a scene, a person(s), an animal(s), and/or any object(s). A camera can refer to a device that receives light and captures image frames, such as still images or video frames, using an image sensor. The terms "image," "image frame," and "frame" are used interchangeably herein. A camera system can include processors (e.g., an image signal processor (ISP), etc.) that can receive one or more images and process the one or more images. For example, a raw image captured by a camera sensor can be processed by an ISP to generate a final image. Processing by the ISP can be performed by filters or processing blocks applied to the captured image, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) are increasingly equipped with camera hardware to capture image frames, such as still images and/or video frames, for consumption. For example, an electronic device can include a camera to allow the electronic device to capture a video or image of a scene, a person, an object, etc. A camera is a device that receives light and captures image frames (e.g., still images or video frames) using an image sensor. In some examples, a camera may include one or more processors, such as image signal processors (ISPs), that can process one or more image frames captured by an image sensor. For example, a raw image frame captured by an image sensor can be processed by an image signal processor (ISP) of a camera to generate a final image. In some cases, an electronic device implementing a camera can further process a captured image or video for certain effects (e.g., compression, image enhancement, image restoration, scaling, framerate conversion, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

As indicated above, raw image data captured by image sensors may be processed by an image processing system, for example an ISP, to yield a final output image. In some cases, the image processing system may process an image using multiple stages. For example, a pre-processing stage may be used to perform real-time pre-processing of full resolution image data and this image data may be used, for example to adjust an image sensor or provide low-level image correction and/or compensation. The pre-processing stage may be performed, for example, by a frontend engine of an image frontend in the image processing system. In some cases, pre-processed image data may be stored in a memory and then retrieved from the memory for additional processing. This additional processing may be performed on portions of a pre-processed image, rather than on an entire image at a time, and the pre-processed image may be streamed from the memory for the additional processing. The additional processing may be performed, for example, by an image processor of the image processing system.

Increasingly, devices are being produced with multiple cameras with multiple image sensors. In some cases, image data from these multiple image sensors may be processed by a common image processing system. To allow the image processing system to process image data from different image sensors, the image frontend may include multiple frontend engines and each of the multiple frontend engines may be capable of processing image data from any of the image sensors. Allowing any frontend engine to process image data from any image sensor provides flexibility to the image sensor and can reduce a design, test, and production costs for the frontend engines.

As any frontend engine can process image data from any image sensor, certain pre-processing operations that may be used by less than all of the image sensors may be implemented by all of the frontend engines. In some cases, the image frontend may be the largest part of an image processing system as the image frontend, and frontend engines, may operate on full resolution images and may include buffers sufficiently large to hold the full resolution images. In some aspects, a frontend engine may include a pipeline of frontend modules that are configured to perform pre-processing operations for the front engine. Additionally, replicating frontend modules to perform pre-processing operations that may be used by less than all of the image sensors incurs a further area penalty. In some cases, it may be beneficial to virtualize frontend modules that perform pre-processing operations that may be used by less than all of the image sensors from the frontend engines to an auxiliary engine that may be shared by multiple frontend engines. This virtualizing of certain frontend modules may help reduce or remove the area penalty from redundant frontend modules. The modules may also be referred to as blocks.

Various aspects of the application will be described with respect to the figures.

Figure 1:
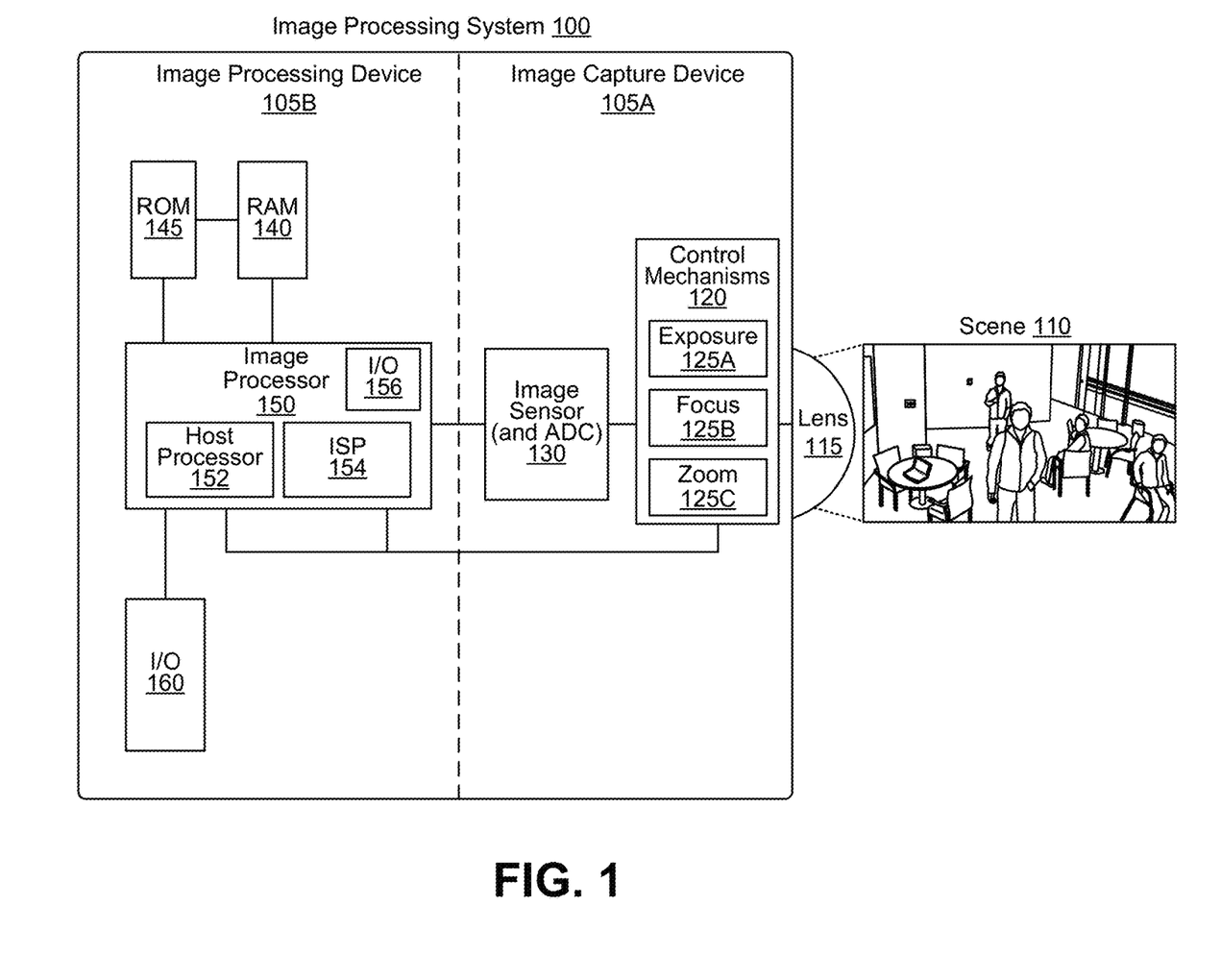
FIG. 1 is a block diagram illustrating an example architecture of an image processing system, in accordance with some examples of the present disclosure.

FIG. 1 is a block diagram illustrating an example architecture of an image processing system 100. The image processing system 100 includes various components that are used to capture and process images, such as an image of a scene 110. The image processing system 100 can capture image frames (e.g., still images or video frames). In some cases, the lens 115 and image sensor 130 can be associated with an optical axis. In one illustrative example, the photosensitive area of the image sensor 130 (e.g., the photodiodes) and the lens 115 can both be centered on the optical axis.

In some examples, the lens 115 of the image processing system 100 faces a scene 110 and receives light from the scene 110. The lens 115 bends incoming light from the scene toward the image sensor 130. The light received by the lens 115 then passes through an aperture of the image processing system 100. In some cases, the aperture (e.g., the aperture size) is controlled by one or more control mechanisms 120. In other cases, the aperture can have a fixed size.

The one or more control mechanisms 120 can control exposure, focus, and/or zoom based on information from the image sensor 130 and/or information from the image processor 150. In some cases, the one or more control mechanisms 120 can include multiple mechanisms and components. For example, the control mechanisms 120 can include one or more exposure control mechanisms 125A, one or more focus control mechanisms 125B, and/or one or more zoom control mechanisms 125C. The one or more control mechanisms 120 may also include additional control mechanisms besides those illustrated in FIG. 1. For example, in some cases, the one or more control mechanisms 120 can include control mechanisms for controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting the focus. In some cases, additional lenses may be included in the image processing system 100. For example, the image processing system 100 can include one or more microlenses over each photodiode of the image sensor 130. The microlenses can each bend the light received from the lens 115 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and the focus control mechanism 125B.

The exposure control mechanism 125A of the control mechanisms 120 can obtain an exposure setting. In some cases, the exposure control mechanism 125A stores the exposure setting in a memory register. Based on the exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, the image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor discussed with respect to the computing device architecture 900 of FIG. 9. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140, read-only memory (ROM) 145, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or any combination thereof. In some cases, a caption may be input into the image processing device 105B through a physical keyboard or keypad of the I/O devices 160, or through a virtual key board or keypad of a touchscreen of the I/O devices 160. The I/O devices 160 may include one or more ports, jacks, or other connectors that enable a wired connection between the image processing system 100 and one or more peripheral devices, over which the image processing system 100 may receive data from the one or more peripheral device and/or transmit data to the one or more peripheral devices. The I/O devices 160 may include one or more wireless transceivers that enable a wireless connection between the image processing system 100 and one or more peripheral devices, over which the image processing system 100 may receive data from the one or more peripheral device and/or transmit data to the one or more peripheral devices. The peripheral devices may include any of the previously-discussed types of the I/O devices 160 and may themselves be considered I/O devices 160 once they are coupled to the ports, jacks, wireless transceivers, or other wired and/or wireless connectors.

In some cases, the image processing system 100 may be a single device. In some cases, the image processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A. In some examples, the image processing system 100 can include one or more wireless transceivers for wireless communications, such as cellular network communications, 802.11 wi-fi communications, wireless local area network (WLAN) communications, or some combination thereof.

The image processing system 100 can be part of, or implemented by, a single computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an HMD, smart glasses, etc.), an IoT (Internet-of-Things) device, a smart wearable device, a video streaming device, an Internet Protocol (IP) camera, or any other suitable electronic device(s).

The image capture device 105A and the image processing device 105B can be part of the same electronic device or different electronic devices. In some implementations, the image capture device 105A and the image processing device 105B can be different devices. For instance, the image capture device 105A can include a camera device and the image processing device 105B can include a computing device, such as a mobile device, a desktop computer, a smartphone, a smart television, a game console, or other computing device.

While the image processing system 100 is shown to include certain components, one of ordinary skill will appreciate that the image processing system 100 can include more components than those shown in FIG. 1. The components of the image processing system 100 can include software, hardware, or one or more combinations of software and hardware. For example, in some implementations, the components of the image processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image processing system 100.

In some examples, the computing device architecture 600 shown in FIG. 6 and further described below can include the image processing system 100, the image capture device 105A, the image processing device 105B, or a combination thereof.

Figure 2:
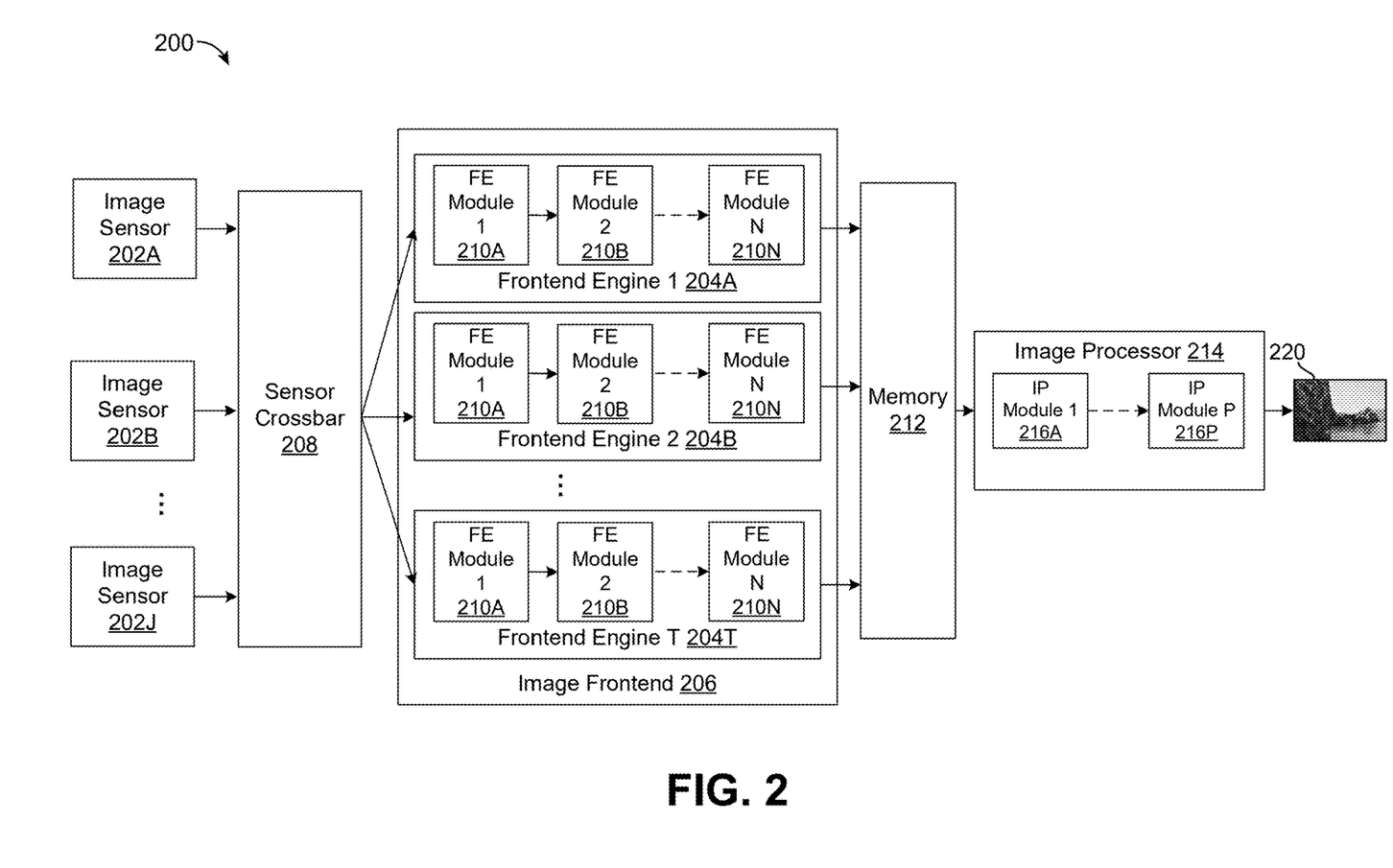
FIG. 2 is a block diagram illustrating an example system for data processing, in accordance with aspects of the present disclosure.

FIG. 2 is a block diagram illustrating an example system 200 for data processing, in accordance with aspects of the present disclosure. The system 200 may generate a final image 220 using images captured from any of image sensors 202A, 202B, . . . 202J (collectively referred to as image sensors 202). In some cases, image sensors 202 may be image sensors 130 of FIG. 1. In some cases, the final image 220 may be generated from images captured by multiple image sensors 202. The image sensors 202 may be coupled to T frontend engines 204A, 204B, . . . 204T (collectively frontend engines 204) of an image frontend 206 via a sensor crossbar 208. The image crossbar 208 may couple each of the image sensors 202 to each of the frontend engines 204 of the image frontend 206. In some cases, as each of the image sensors 202 are coupled to each of the frontend engines 204 of the image frontend 206, any of the frontend engines 204 may be used to pre-process image data from any of the image sensors 202. In some examples, a number of frontend engines 204 included in the image frontend 206 may be based on a number of image sensors 202 that may be used concurrently.

The image frontend 206 may perform real-time pre-processing of full resolution image data as captured by the image sensors 202. To allow for the pre-processing of the full resolution images, the image frontend 206 may include large image buffers (not shown) sufficient to store one or more full resolution images as captured by the image sensors 202. In some cases, the image frontend engines 204 of the image frontend 206 may perform one or more pre-processing operations. The pre-processing operations can include, for example and without limitation, auto-focusing operations, chromatic aberration correction, pixel brightness transformation (e.g., brightness correction, grey scale transformation, etc.), color space conversion, geometric transformation (e.g., rotation, scaling, translation, affine transformation, resizing, etc.), image filtering (e.g., image and/or edge smoothing and/or enhancement, denoising, image sharpening, etc.), image warping, image segmentation, image restoration, image enhancement, lens shading, color correction, black level adjustment, lens distortion correction, faulty pixel replacement, demosaicking, color balancing, compression, interpolation, any other image pre-processing operations, and/or a combination thereof. In some cases, operations that may be performed as a pre-processing operation by a frontend engine 204 may be those operations that should be performed with relatively low-latency, such as for phase detection auto-focusing, or those operations that, when performed at a beginning of an image processing pipeline, can yield a higher image quality, such as for chromatic aberration correction.

In some cases, the frontend engines 204 may include a processing pipeline of N (e.g., two or more) frontend modules 210A, 210B, . . . 210N (collectively, frontend modules 210) which can apply the one or more pre-processing operations. For a first example, a frontend module, such as frontend module 1 210A, may pre-process images from the image sensors 202 to perform phase detection auto-focus operations. As a second example, another frontend module, such as frontend module 2 210B, may perform chromatic aberration correction operations. In some cases, as any of the frontend engines 204 may be used to pre-process image data from any of the image sensors 202, the frontend engines 204 may all be identical and include the same frontend modules 210. Having identical image frontend engines 204 can help reduce design, test, and production costs as individual frontend engines do not need to be developed, tested, and/or produced for different types of image sensors. Additionally, identical image frontend engines 204 can allow designers more flexibility to select image sensors 202 and customize features for different end products without having to take into account different types of frontend engines 204.

In some cases, while the frontend engines 204 may all include the frontend modules 210 for pre-processing images from any of the image sensors 202, images from some image sensors 202 may not be pre-processed by certain frontend modules 210 of the frontend engines 204. Referring to the first example above, an image sensor, such as image sensor 202A may support phase detection and images generated by image sensor 202A may be pre-processed by a frontend module, such as frontend module 1 210A, which performs phase detection auto-focus operations. Another image sensor, such as image sensor 202B, may not support phase detection and thus images generated by image sensor 202B may not be pre-processed by the frontend module, such as frontend module 1 210A, which performs phase detection auto-focus operations. Referring to the second example, above, lateral chromatic aberration correction operations may be performed, for example by frontend module 2 210B, on images produced by an ultra-wide angle sensor, for example image sensor 202B, but not on images produced by other image sensors, such as image sensor 202A. In some examples, the frontend modules 210 may be software controlled so that the appropriate frontend modules 210 are selected based on which image sensor 202 is providing the image data.

After the frontend modules 210 pre-process the images from the image sensors 202, the pre-processed image may be written to a memory 212. The image processor 214 may perform offline (e.g., memory to memory) processing of the pre-processed image data from memory 212. As the image processor 214 does not need to process images in real-time, the image processor 214 may process an image in portions, for example, by reading a portion of a pre-processed image (e.g., a stripe of image data), process that portion, write that processed portion back to memory 212, and then process a next portion of the pre-processed image. After all portions of the image are processed, the processed portions of the final image 220 may be retrieved from memory 212 and output. As the image processor 214 may be able to process images in portions, rather than an entire image at a time, the image processor 214 may include a relatively lower amount of buffer memory as compared to the image frontend 206. Additionally, as the image processor 214 may not process images in real-time, fewer image processor 214 may be used as compared to a number of possible concurrently operating image sensors. In some cases, a single image processor 214 may be used with multiple image sensors 202.

In some cases, the image processor 214 may include a processing pipeline including any number of image processor modules 216A . . . 216P for performing one or more processing operations on the pre-processed image data. The one or more processing operations can include, for example and without limitation, a filtering operation, a blending operation (e.g., blending pixel values) and/or interpolation operation, a pixel brightness transformation (e.g., brightness correction, grey scale transformation, etc.), a color space conversion, a geometric transformation (e.g., rotation, scaling, translation, affine transformation, resizing, etc.), a cropping operation, a white balancing operation, a denoising operation, an image sharpening operation, chroma sampling, image scaling, a lens correction operation, a segmentation operation, a filtering operation (e.g., filtering in terms of adjustments to the quality of the image in terms of contrast, noise, texture, resolution, etc.), an image warping operation, an image restoration operation, a lens shading operation, a lens distortion correction operation, a faulty pixel replacement operation, a demosaicking operation, a color balancing operation, a smoothing operation, an image enhancement operation, an operation for implementing an image effect or stylistic adjustment, a feature enhancement operation, an image scaling or resizing operation, a color correction operation, a black level adjustment operation, a linearization operation, a gamma correction operation, any other image post-processing operations, and/or a combination thereof.

In some examples, one or more components of system 200 may be integrated into a single chip or integrated circuit. For example, the sensor crossbar 208, image frontend 206, memory 212, and image processor 214 may be integrated into a single image signal processor. As another example, components of system 200 may be integrated into a SoC, as discussed above, with respect to FIG. 1.

As indicated above, as any of the image frontend engines 204 can pre-process images from any image sensor 202, the image frontend engines 204 may be the same (e.g., include the same frontend modules). One issue with having identical image frontend engines is that certain operations may be used by less than all of the image sensors 202. Returning to the previous example, phase detection auto-focus operations and chromatic aberration correction operations may be used by less than all of the image sensors 202 (e.g., just one, or even none, of the image sensors 202). In such cases, replicating redundant frontend modules performing such operations across all of the image frontend engines 204 incurs an area penalty as a physical size of the frontend engines 204 is increased to include circuitry for the respective redundant frontend modules. In some cases, redundant frontend modules may be virtualized across the frontend engines to help reduce or remove the area penalty.

Figure 3:
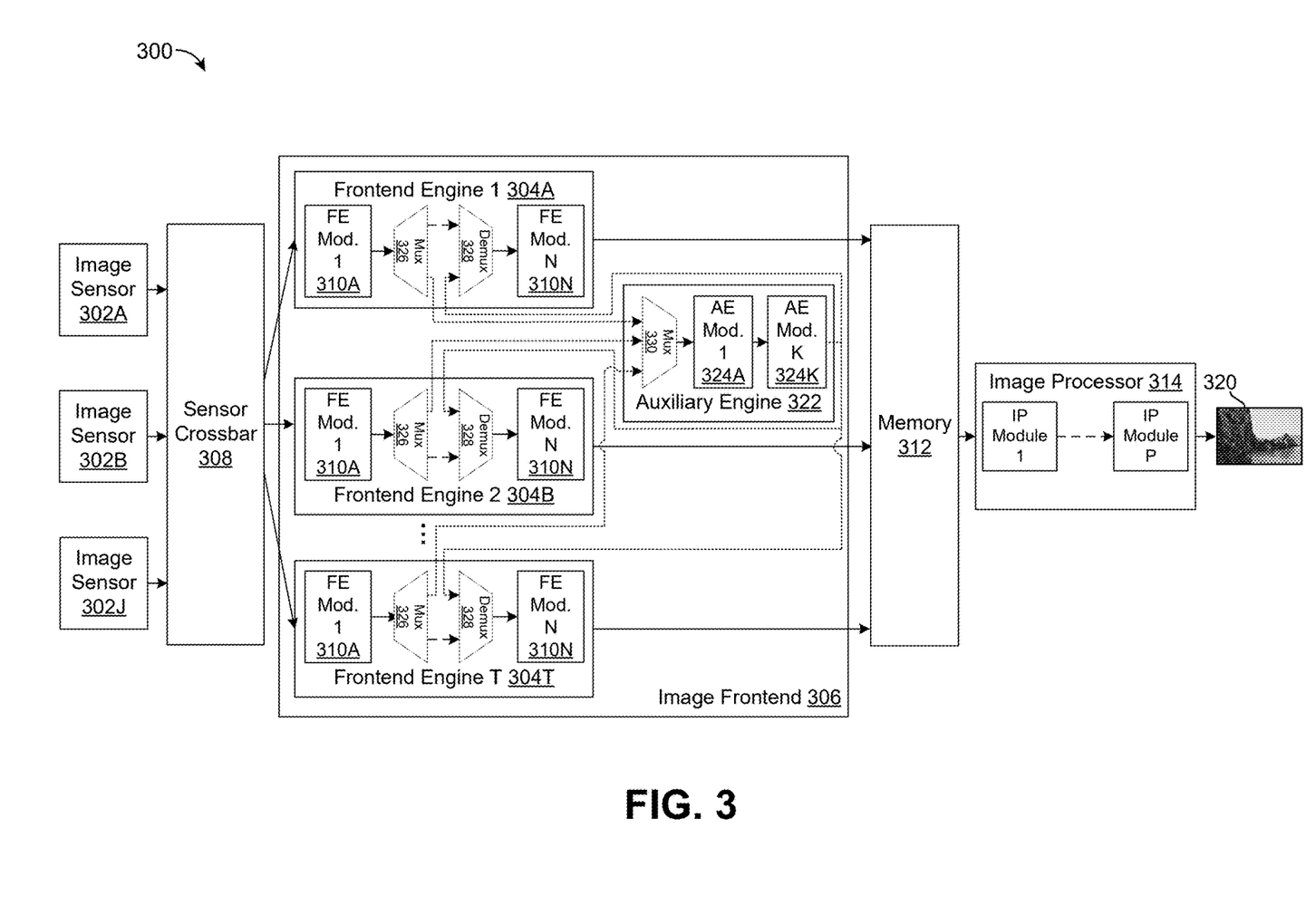
FIG. 3 is a block diagram illustrating an example system for data processing including an auxiliary engine for virtualizing frontend modules, in accordance with aspects of the present disclosure.

FIG. 3 is a block diagram illustrating an example system 300 for data processing including an auxiliary engine for virtualizing frontend modules, in accordance with aspects of the present disclosure. In system 300, like system 200 of FIG. 2, two or more image sensors 302A, 302B, . . . 302J (collectively image sensors 302) may pass images via a sensor crossbar 308 to an image frontend 306 for pre-processing by a set of T frontend engines 304A, 304B, . . . 304T (collectively frontend engines 304). As with system 200, in system 300, the image frontend 306 may perform real-time pre-processing of full resolution image data as captured by the image sensors 302. The frontend engines 304 include a processing pipeline of two or more frontend modules 310A . . . 310N for performing the pre-processing operations.

The image frontend 306 also includes an auxiliary engine 322 coupled to the frontend engines 304. In some cases, in addition to the frontend modules 310, the frontend engines 304 may also include a multiplexer 326 and a demultiplexer 328. The frontend engines 304 may be coupled, via the multiplexer 326 and the demultiplexer 328 to a multiplexer 330 of the auxiliary engine 322.

In some cases, the auxiliary engine 322 may include the multiplexer 330 along with any number K of auxiliary engine modules 324A . . . 324K (collectively auxiliary engine modules 324). Like the frontend modules 310, the auxiliary engine modules 324 may perform pre-processing operations of full resolution image data as captured by the image sensors 302. In some cases, auxiliary engine modules 324 may be implemented in a manner substantially similar to frontend modules 310, and frontend modules 310 which perform pre-processing operations that are used by less than all of the image sensors 302 may be implemented in (e.g., moved to) the auxiliary engine 322. Referring to the example discussed above in conjunction with FIG. 2, lateral chromatic aberration correction operations may be used by a single image sensor, such as an ultra-wide angle image sensor, and the lateral chromatic aberration correction operations may be performed, for example by frontend module 2 210B. This frontend module may not be implemented in the frontend engines 304 of system 300. Instead, the pre-processing operations performed by frontend module 2 210B may be implemented in the auxiliary engine 322 as an auxiliary engine module 324, such as auxiliary engine module 1 324A.

In some cases, a tap out and a tap in point from the frontend engines 304 to the auxiliary engine 322 may replace a frontend module, such as frontend module 2 210B, that is implemented in (e.g., moved to) the auxiliary engine 322. In some cases, image quality may be enhanced when a series of image pre-processing operations are performed in a certain order. This order may define how frontend modules 310 are ordered in the frontend engines 304. As an example, image quality may be enhanced when lateral chromatic aberration correction operations are performed by frontend module 2 210B after other pre-processing operations are performed by frontend module 1 210A. Other operations may also be performed after the lateral chromatic aberration correction operations are performed. To help preserve this order of operations, if the lateral chromatic aberration correction operations are implemented in an auxiliary engine module, such as auxiliary engine module 1 324A, a tap out and a tap in from the frontend engines 304 to the auxiliary engine 322 may be placed where the frontend module implementing the lateral chromatic aberration correction operations would have been placed. In some cases, tap out and a tap in from the frontend engines 304 to the auxiliary engine 322 may be present in all of the frontend engines 304 of the image frontend 306. In some cases, the tap out functionality may be provided by multiplexer 326 and the tap in functionality may be provided by demultiplexer 328.

In some cases, the multiplexer 326 and demultiplexer 328 may be software controlled to direct the data flow to the auxiliary engine 322 when an auxiliary engine module 324 is to be used. For example, data from frontend module 1 310A would be output, via multiplexer 326 to the appropriate auxiliary engine module 324 through multiplexer 330 of the auxiliary engine 322.

In some cases, multiplexer 330 of the auxiliary engine 322 may select input from the appropriate frontend engine 304. In some cases, the multiplexer 330 and auxiliary engine modules 324 may also be software controlled to select the appropriate input from among the frontend engines 304 and select the appropriate auxiliary engine modules 324. In some cases, image data from one frontend engines 304 may be input to the auxiliary engine 322 at a time. In other cases, image data from multiple frontend engines 304 may be input to the auxiliary engine 322 at a time. How many frontend engines 304 the auxiliary engine 322 can receive input from at a time may depend on which auxiliary engine modules 324 are to be used and/or auxiliary engine modules 324 availability. In some cases, the auxiliary engine 322 may have multiple multiplexers 330. For example, the auxiliary engine 322 may have a multiplexer 330 and auxiliary engine module(s) 324 combination for each pre-processing operation supported by the auxiliary engine 322.

After pre-processing by the appropriate auxiliary engine modules 324, the auxiliary engine 322 may output the image data through the demultiplexer 328 of the frontend engine 1 304A to the next appropriate frontend module 310 (if any). The frontend engine 304A may continue to pre-process the image data in a manner similar to frontend engine 204A, if no additional pre-processing operations are to be performed by the auxiliary engine 322.

In some cases, a clock rate of the auxiliary engine 322 may be the same as, or faster than a maximum clock rate of the frontend engines 304 so the auxiliary engine 322 can better maintain performance with the frontend engines 304 and ease potential clock domain crossing issues.

In some cases, the auxiliary engine 322 may be bypassed. For example, image data from a non-ultra-wide angle image sensor may not need lateral chromatic aberration correction operations performed. In this example, image data may be input to multiplexer 326 from frontend module 1 310A and passed directly to demultiplexer 328 and on to the next appropriate frontend module 310 (if any).

In some cases, parameterized pipeline stages may be placed between one or more frontend engines 304 and the auxiliary engines. These parameterized pipeline stages may be adjusted per frontend engine 304 based on how physically distant a particular frontend engine 304 is from the auxiliary engine 322.

Figure 4:
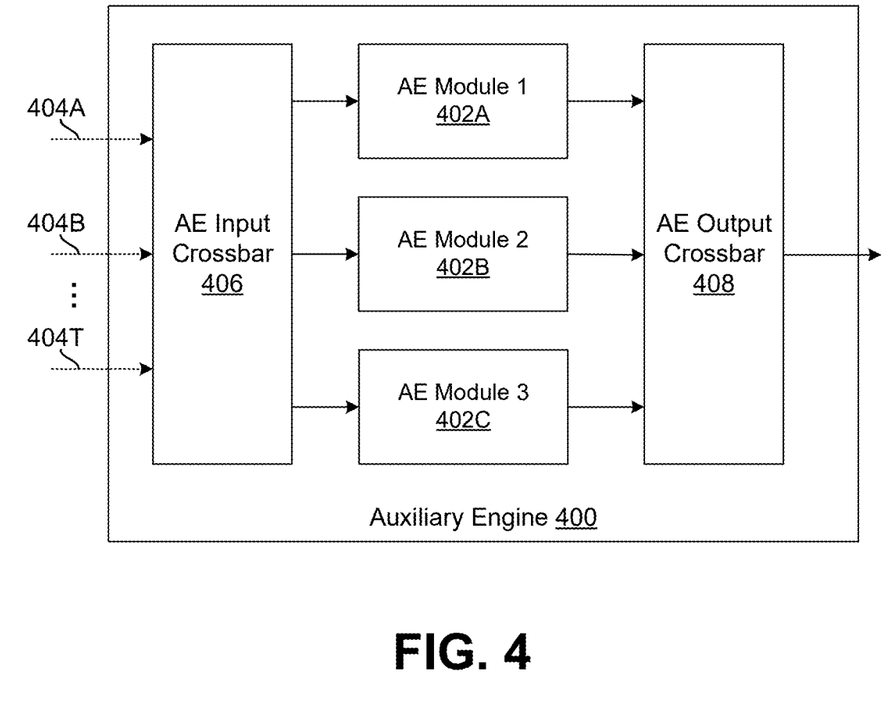
FIG. 4 is a block diagram of an enhanced auxiliary engine, in accordance with aspects of the present disclosure.

FIG. 4 is a block diagram of an enhanced auxiliary engine 400, in accordance with aspects of the present disclosure. In some cases, pre-processing operations that may be concurrently used by less than all image sensors may also be implemented in an enhanced auxiliary engine 400. As an example, a device may include multiple image sensors, all of which use phase detection auto-focus operations, but the device is configured (e.g., based on usability issues and/or feature differentiation/marketing concerns) so that less than all (e.g., two) of the image sensors may be used concurrently. Implementing phase detection auto-focus operations in the frontend engines, while maintaining the ability for any image sensor to use any frontend engine, may have resulted in a phase detection auto-focus frontend engine module in each frontend engine. Rather than implementing phase detection auto-focus operations in each frontend engine, phase detection auto-focus operations may be implemented in the enhanced auxiliary engine based on expected concurrent use cases (e.g., two image sensors being used concurrently). For example, enhanced auxiliary engine 400 may be enhanced to dynamically and concurrently direct multiple data flows to one or more auxiliary engine modules 402A, 402B, . . . 402O (collectively auxiliary engine modules 424).

In the enhanced auxiliary engine 400, a first input 404A from one of the frontend engines (not shown) may be directed by an auxiliary engine input crossbar 406 to a first auxiliary engine module, such as auxiliary engine module 2 402B. Output of the auxiliary engine module 2 402B may be passed to an auxiliary output crossbar 408, which directs the output back to the appropriate frontend engine. Concurrently, a second input 404B from another of the frontend engines may be directed by the auxiliary engine input crossbar 406 to a second auxiliary engine module, such as auxiliary engine module 1 402A. Output of the auxiliary engine module 1 402A may also be passed to the auxiliary output crossbar 408, which directs the output back to the appropriate frontend engine. In the above discussed example, as the expected concurrent use case is for two concurrent phase detection auto-focus operations, a third auxiliary engine module 3 402C, shown in the enhanced auxiliary engine 400, may be omitted.

In some cases, the enhanced auxiliary engine 400 may also be used to enable variations of a pre-processing operation. As an example, different auxiliary engine modules 402 may perform phase detection auto-focus operations in different ways. The enhanced auxiliary engine 400 may include as many different auxiliary engine modules 402 for performing phase detection auto-focus operations as desired. In this example, an auxiliary engine module, such as auxiliary engine module 1 402A may perform a fully featured phase detection auto-focus operation, another auxiliary engine module, such as auxiliary engine module 2 402B may perform a light-weight version of phase detection auto-focus operations. In some cases, different versions of the enhanced auxiliary engine 400 may include different auxiliary engine modules based on, for example, image sensors and/or feature differentiation/marketing concerns. In some cases, data from any image sensor may be directed to any appropriate auxiliary engine module 402 for pre-processing.

In some cases, techniques discussed above with respect to the enhanced auxiliary engine 400 may be used in place of, or in conjunction with techniques discussed with respect to the auxiliary engine 322 of FIG. 3. In some cases, the techniques discussed with respect to the auxiliary engine 322 and enhanced auxiliary engine 40 may be applied to other processing workflows with parallel symmetric processing engines, such as for image processing and/or graphics processing.

Figure 5:
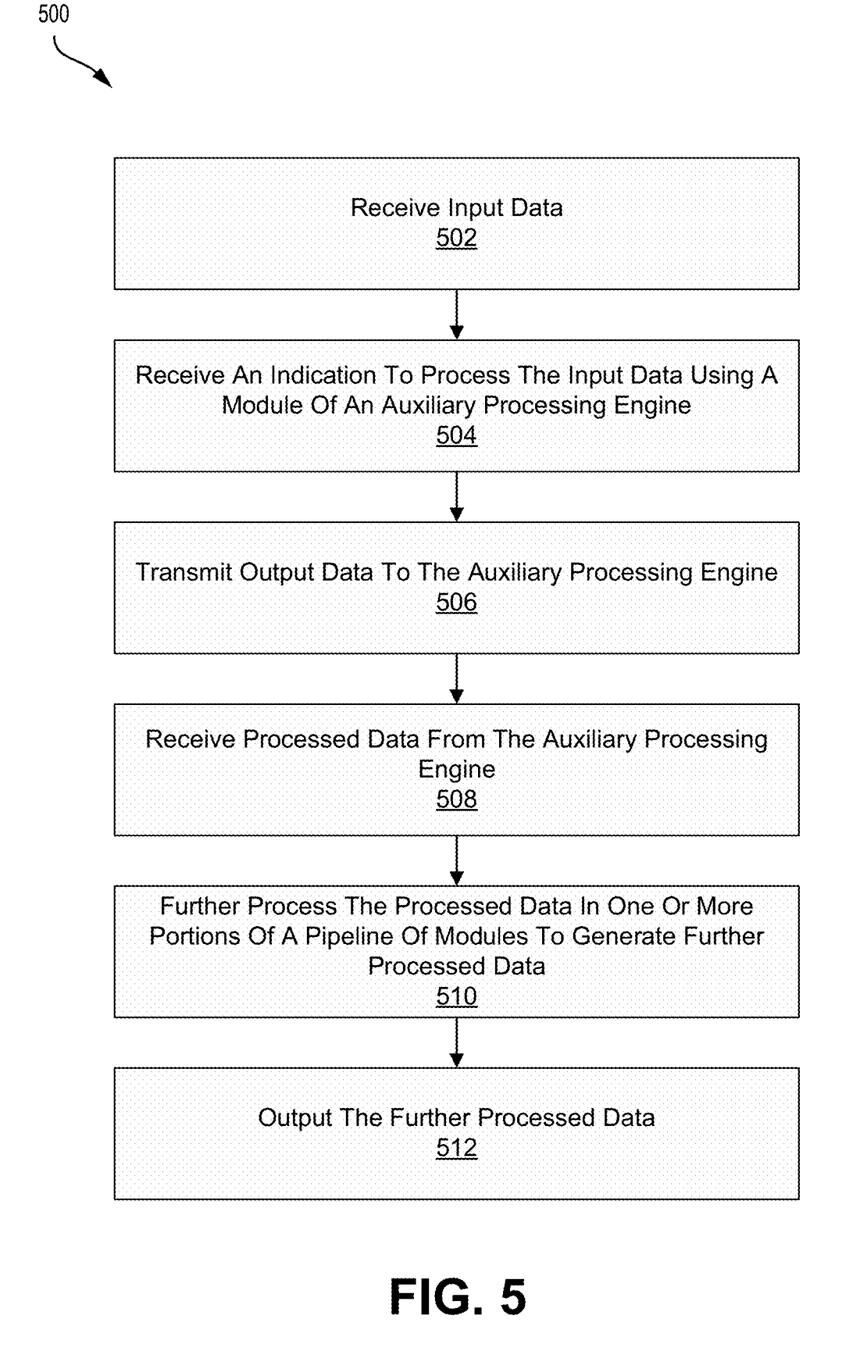
FIG. 5 is a flow diagram for a process for processing data, in accordance with aspects of the present disclosure.

FIG. 5 is a flow diagram for a process 500 for processing data, in accordance with aspects of the present disclosure. The process 500 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 500 may be implemented as software components that are executed and run on one or more processors.

At block 502, a computing apparatus (or component thereof) may receive input data by a symmetrical processing engine of two or more symmetrical processing engines coupled to an auxiliary processing engine. In some cases, the input data is received from two or more image sensors for processing by any one of the two or more symmetrical processing engines. In some cases, the computing device (or component thereof) may receive output data from one of the two or more symmetrical processing engines at a time. In some cases, the computing device (or component thereof) may switch between receiving output data from the symmetrical processing engine to an additional symmetrical processing engine of the two or more symmetrical processing engines At block 504, the computing apparatus (or component thereof) may receive an indication to process the input data using a module of the auxiliary processing engine. In some cases, the computing device (or component thereof) may perform one or more data processing operations used by less than all of the two or more image sensors. In some cases, the computing device (or component thereof) may concurrently receive output data from the two or more symmetrical processing engines. In some cases, the auxiliary processing engine includes a number of modules for performing a data processing operation, wherein the number of modules is based on a number of the two or more symmetrical processing engines from which the auxiliary processing engine can concurrently receive output data. In some cases, the auxiliary processing engine includes one or more crossbars, each crossbar of the one or more crossbars configured to couple one or more image sensors to each symmetrical processing engine of the two or more symmetrical processing engines.

At block 506, the computing apparatus (or component thereof) may transmit output data to the auxiliary processing engine. At block 508, the computing apparatus (or component thereof) may receive processed data from the auxiliary processing engine. At block 510, the computing apparatus (or component thereof) may further process the processed data in one or more portions of a pipeline of modules of the symmetrical processing engine to generate further processed data. At block 512, the computing apparatus (or component thereof) may output the further processed data.

Figure 6:
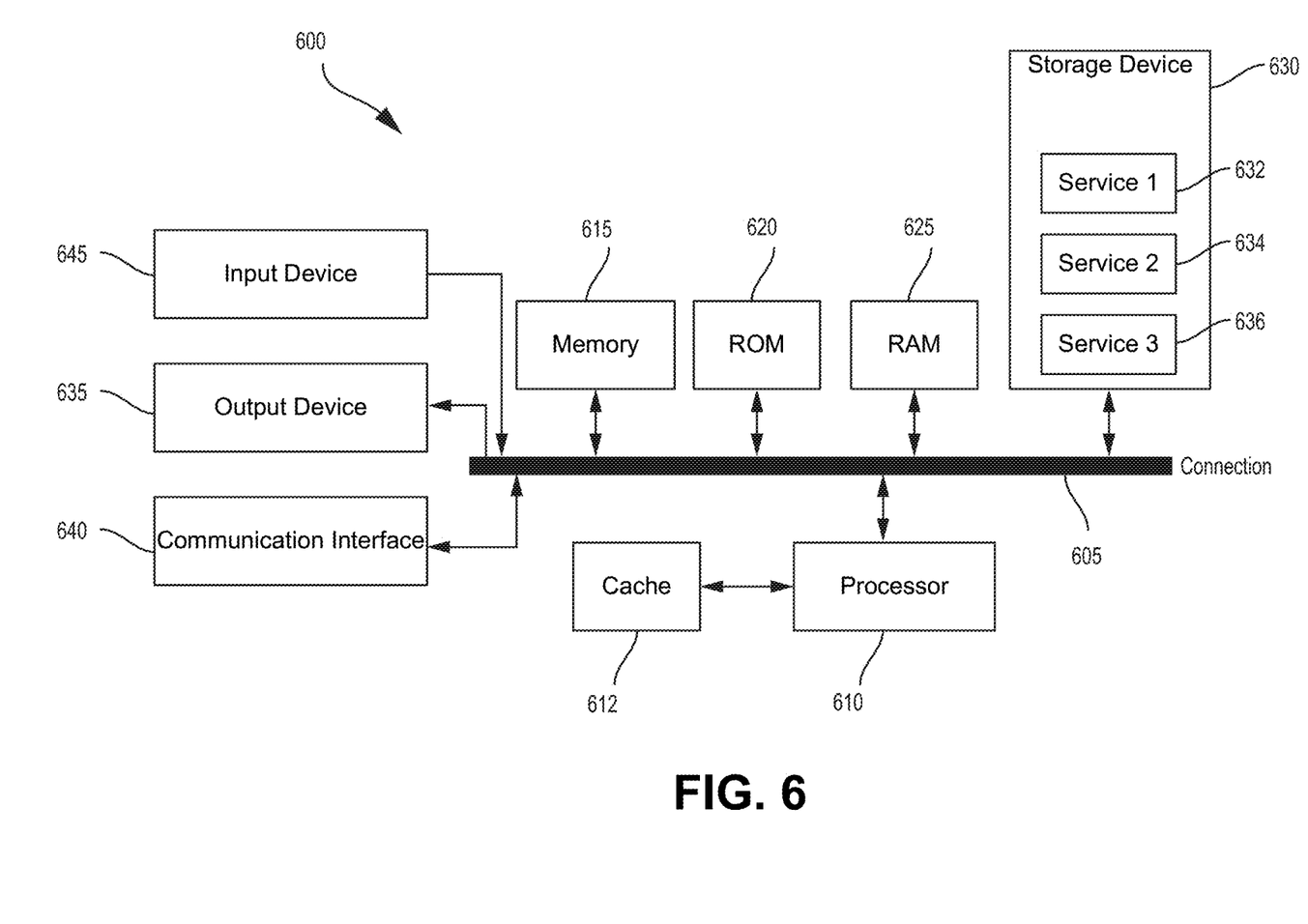
FIG. 6 illustrates an example computing device architecture of an example computing device which can implement the various techniques described herein.

FIG. 6 illustrates an example computing device architecture 600 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 600 may include image processing system 100 of FIG. 1. The components of computing device architecture 600 are shown in electrical communication with each other using connection 605, such as a bus. The example computing device architecture 600 includes a processing unit (CPU or processor) 610 and computing device connection 605 that couples various computing device components including computing device memory 615, such as read only memory (ROM) 620 and random access memory (RAM) 625, to processor 610.

Computing device architecture 600 can include a cache of high-speed memory connected directly with, in close proximity to, or integrated as part of processor 610. Computing device architecture 600 can copy data from memory 615 and/or the storage device 630 to cache 612 for quick access by processor 610. In this way, the cache can provide a performance boost that avoids processor 610 delays while waiting for data. These and other modules can control or be configured to control processor 610 to perform various actions. Other computing device memory 615 may be available for use as well. Memory 615 can include multiple different types of memory with different performance characteristics. Processor 610 can include any general purpose processor and a hardware or software service, such as service 1 632, service 2 634, and service 3 636 stored in storage device 630, configured to control processor 610 as well as a special-purpose processor where software instructions are incorporated into the processor design. Processor 610 may be a self-contained system, containing multiple cores or processors, a bus, memory controller, cache, etc. A multi-core processor may be symmetric or asymmetric.

To enable user interaction with the computing device architecture 600, input device 645 can represent any number of input mechanisms, such as a microphone for speech, a touch-sensitive screen for gesture or graphical input, keyboard, mouse, motion input, speech and so forth. Output device 635 can also be one or more of a number of output mechanisms known to those of skill in the art, such as a display, projector, television, speaker device, etc. In some instances, multimodal computing devices can enable a user to provide multiple types of input to communicate with computing device architecture 600. Communication interface 640 can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. Storage device 630 can include services 632, 634, 636 for controlling processor 610. Other hardware or software modules are contemplated. Storage device 630 can be connected to the computing device via connection 605. In one aspect, a hardware module that performs a particular function can include the software component stored in a computer-readable medium in connection with the necessary hardware components, such as processor 610, connection 605, output device 635, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing data, the apparatus comprising: an auxiliary processing engine; and two or more symmetrical processing engines coupled to the auxiliary processing engine, each symmetrical processing engine of the two or more symmetrical processing engines including a pipeline of processing modules, wherein a symmetrical processing engine of the two or more symmetrical processing engines is configured to: receive input data; receive an indication to process the input data using a module of the auxiliary processing engine; transmit output data to the auxiliary processing engine; receive processed data from the auxiliary processing engine; further process the processed data in one or more portions of a pipeline of modules of the symmetrical processing engine; and output the further processed data.

Aspect 2. The apparatus of aspect 1, wherein the input data is received from two or more image sensors for processing by any one of the two or more symmetrical processing engines.

Aspect 3. The apparatus of aspect 2, wherein the auxiliary processing engine is configured to perform one or more data processing operations used by less than all of the two or more image sensors.

Aspect 4. The apparatus of any of aspects 1-3, wherein the auxiliary processing engine is configured to receive output data from one of the two or more symmetrical processing engines at a time.

Aspect 5. The apparatus of aspect 4, wherein the auxiliary processing engine is configured to switch between receiving output data from the symmetrical processing engine to an additional symmetrical processing engine of the two or more symmetrical processing engines.

Aspect 6. The apparatus of any of aspects 1-5, wherein the auxiliary processing engine is configured to concurrently receive output data from the two or more symmetrical processing engines.

Aspect 7. The apparatus of aspect 6, wherein the auxiliary processing engine includes a number of modules for performing a data processing operation, wherein the number of modules is based on a number of the two or more symmetrical processing engines from which the auxiliary processing engine can concurrently receive output data.

Aspect 8. The apparatus of aspect 6, wherein the auxiliary processing engine includes one or more crossbars, each crossbar of the one or more crossbars configured to couple one or more image sensors to each symmetrical processing engine of the two or more symmetrical processing engines.

Aspect 9. A method for processing data, the method comprising: receiving input data by a symmetrical processing engine of two or more symmetrical processing engines coupled to an auxiliary processing engine; receiving an indication to process the input data using a module of the auxiliary processing engine; transmitting output data to the auxiliary processing engine; receiving processed data from the auxiliary processing engine; further processing the processed data in one or more portions of a pipeline of modules of the symmetrical processing engine; and outputting the further processed data.

Aspect 10. The method of aspect 9, wherein the input data is received from two or more image sensors for processing by any one of the two or more symmetrical processing engines.

Aspect 11. The method of aspect 10, further comprising performing one or more data processing operations used by less than all of the two or more image sensors.

Aspect 12. The method of any of aspects 9-11, further comprising receiving output data from one of the two or more symmetrical processing engines at a time.

Aspect 13. The method of aspect 12, further comprising switching between receiving output data from the symmetrical processing engine to an additional symmetrical processing engine of the two or more symmetrical processing engines.

Aspect 14. The method of any of aspects 9-13, further comprising concurrently receiving output data from the two or more symmetrical processing engines.

Aspect 15. The method of aspect 14, wherein the auxiliary processing engine includes a number of modules for performing a data processing operation, wherein the number of modules is based on a number of the two or more symmetrical processing engines from which the auxiliary processing engine can concurrently receive output data.

Aspect 16. The method of aspect 14, wherein the auxiliary processing engine includes one or more crossbars, each crossbar of the one or more crossbars configured to couple one or more image sensors to each symmetrical processing engine of the two or more symmetrical processing engines.

Aspect 17. An apparatus for processing data, the apparatus comprising: means for receiving input data by a symmetrical processing engine of two or more symmetrical processing engines coupled to an auxiliary processing engine; means for receiving an indication to process the input data using a module of the auxiliary processing engine; means for transmitting output data to the auxiliary processing engine; means for receiving processed data from the auxiliary processing engine; means for further processing the processed data in one or more portions of a pipeline of modules of the symmetrical processing engine; and means for outputting the further processed data.

Aspect 18. The apparatus of aspect 17, wherein the input data is received from two or more image sensors for processing by any one of the two or more symmetrical processing engines.

Aspect 19. The apparatus of aspect 18, further comprising means for performing one or more data processing operations used by less than all of the two or more image sensors.

Aspect 20. The apparatus of any of aspects 17-19, further comprising means for receiving output data from one of the two or more symmetrical processing engines at a time.

Aspect 21. The apparatus of aspect 20, further comprising means for switching between receiving output data from the symmetrical processing engine to an additional symmetrical processing engine of the two or more symmetrical processing engines.

Aspect 22. The apparatus of any of aspects 17-21, further comprising means for concurrently receiving output data from the two or more symmetrical processing engines.

Aspect 23. The apparatus of aspect 22, wherein the auxiliary processing engine includes a number of modules for performing a data processing operation, wherein the number of modules is based on a number of the two or more symmetrical processing engines from which the auxiliary processing engine can concurrently receive output data.

Aspect 24. The method of aspect 22, wherein the auxiliary processing engine includes one or more crossbars, each crossbar of the one or more crossbars configured to couple one or more image sensors to each symmetrical processing engine of the two or more symmetrical processing engines.

Aspect 25. A non-transitory computer-readable medium including instructions which, when executed by one or more processors, cause the one or more processors to perform operations according to any of Aspects 1 to 24.

What is claimed is:

1. An apparatus for processing data, the apparatus comprising:
    an auxiliary processing engine; and
    two or more symmetrical processing engines coupled to the auxiliary processing engine, each symmetrical processing engine of the two or more symmetrical processing engines including a pipeline of processing modules, wherein the two or more symmetrical processing engines and the auxiliary processing engine are configured to preprocess image data for an image signal processor, wherein the auxiliary processing engine is configured to receive output data from one of the two or more symmetrical processing engines at a time, and to switch between receiving output data from the symmetrical processing engine to an additional symmetrical processing engine of the two or more symmetrical processing engines, and wherein a symmetrical processing engine of the two or more symmetrical processing engines is configured to:
    receive input data, wherein any one of the two or more symmetrical processing engines is configured to receive the input data from any of a plurality of image sensors;
    receive an indication to process the input data using a module of the auxiliary processing engine;
    transmit output data to the auxiliary processing engine;
    receive processed data from the auxiliary processing engine;
    further process the processed data in one or more portions of a pipeline of modules of the symmetrical processing engine to generate further processed data; and
    output the further processed data for processing by the image signal processor.

2. The apparatus of claim 1, wherein the auxiliary processing engine is configured to perform one or more data processing operations used by less than all of the plurality of image sensors.

3. The apparatus of claim 1, wherein the auxiliary processing engine is configured to concurrently receive output data from the two or more symmetrical processing engines.

4. The apparatus of claim 3, wherein the auxiliary processing engine includes a number of modules for performing a data processing operation, wherein the number of modules is based on a number of the two or more symmetrical processing engines from which the auxiliary processing engine can concurrently receive output data.

5. The apparatus of claim 3, wherein the auxiliary processing engine includes one or more crossbars, each crossbar of the one or more crossbars configured to couple one or more image sensors of the plurality of image sensors to each symmetrical processing engine of the two or more symmetrical processing engines.

6. A method for processing data, the method comprising:
receiving input data by a symmetrical processing engine of two or more symmetrical processing engines coupled to an auxiliary processing engine, wherein the two or more symmetrical processing engines and auxiliary processing engine preprocess image data for an image signal processor, wherein any one of the two or more symmetrical processing engines is configured to receive the input data from any of a plurality of image sensors;
receiving output data from one of the two or more symmetrical processing engines at a time;
switching between receiving output data from the symmetrical processing engine to an additional symmetrical processing engine of the two or more symmetrical processing engines;
receiving an indication to process the input data using a module of the auxiliary processing engine;
transmitting output data to the auxiliary processing engine;
receiving processed data from the auxiliary processing engine;
further processing the processed data in one or more portions of a pipeline of modules of the symmetrical processing engine to generate further processed data; and
outputting the further processed data for processing by the image signal processor.

7. The method of claim 6, further comprising performing one or more data processing operations used by less than all of the plurality of image sensors.

8. The method of claim 6, further comprising concurrently receiving output data from the two or more symmetrical processing engines.

9. The method of claim 8, wherein the auxiliary processing engine includes a number of modules for performing a data processing operation, wherein the number of modules is based on a number of the two or more symmetrical processing engines from which the auxiliary processing engine can concurrently receive output data.

10. The method of claim 8, wherein the auxiliary processing engine includes one or more crossbars, each crossbar of the one or more crossbars configured to couple one or more image sensors of the plurality of image sensors to each symmetrical processing engine of the two or more symmetrical processing engines.

11. An apparatus for processing data, the apparatus comprising:
means for receiving input data by a symmetrical processing engine of two or more symmetrical processing engines coupled to an auxiliary processing engine, wherein the two or more symmetrical processing engines and auxiliary processing engine are configured to preprocess image data for an image signal processor, wherein any one of the two or more symmetrical processing engines is configured to receive the input data from any of a plurality of image sensors;
means for receiving an indication to process the input data using a module of the auxiliary processing engine;
means for switching between receiving output data from the symmetrical processing engine to an additional symmetrical processing engine of the two or more symmetrical processing engines;
means for transmitting output data to the auxiliary processing engine;
means for receiving processed data from the auxiliary processing engine;
means for further processing the processed data in one or more portions of a pipeline of modules of the symmetrical processing engine; and
means for outputting the further processed data for processing by the image signal processor.

12. The apparatus of claim 11, further comprising means for performing one or more data processing operations used by less than all of the plurality of image sensors.

13. The apparatus of claim 11, further comprising means for receiving output data from one of the two or more symmetrical processing engines at a time.

14. The apparatus of claim 11, further comprising means for concurrently receiving output data from the two or more symmetrical processing engines.

15. The apparatus of claim 14, wherein the auxiliary processing engine includes a number of modules for performing a data processing operation, wherein the number of modules is based on a number of the two or more symmetrical processing engines from which the auxiliary processing engine can concurrently receive output data.

16. The apparatus of claim 14, wherein the auxiliary processing engine includes one or more crossbars, each crossbar of the one or more crossbars configured to couple one or more image sensors of the plurality of image sensors to each symmetrical processing engine of the two or more symmetrical processing engines.

17. An apparatus for processing data, the apparatus comprising:
an auxiliary processing engine; and
two or more symmetrical processing engines coupled to the auxiliary processing engine, wherein the two or more symmetrical processing engines and the auxiliary processing engine are configured to preprocess image data for an image signal processor, wherein the auxiliary processing engine is configured to switch between receiving output data from a symmetrical processing engine to an additional symmetrical processing engine of the two or more symmetrical processing engines, and wherein a symmetrical processing engine of the two or more symmetrical processing engines is configured to:
receive input data, wherein any one of the two or more symmetrical processing engines is configured to receive the input data from any of a plurality of image sensors;
receive an indication to process the input data using a module of the auxiliary processing engine;
transmit output data to the auxiliary processing engine;
receive processed data from the auxiliary processing engine;
process the processed data in the symmetrical processing engine to generate further processed data; and
output the further processed data for processing by the image signal processor.

* * * * *